US008156177B2

(12) United States Patent
Bein et al.

(10) Patent No.: US 8,156,177 B2
(45) Date of Patent: Apr. 10, 2012

(54) FAIL-SAFE SYSTEM FOR MANAGING OF CLIENT-SERVER COMMUNICATION

(75) Inventors: Kerstin Bein, Frankenthal (DE); Wolfgang Schmidt, Zwingenberg (DE)

(73) Assignee: Software AG, Darmstadt (DE)

( * ) Notice: Subject to any disclaimer, the term of this patent is extended or adjusted under 35 U.S.C. 154(b) by 623 days.

(21) Appl. No.: 11/674,946

(22) Filed: Feb. 14, 2007

(65) Prior Publication Data

US 2007/0203976 A1     Aug. 30, 2007

(30) Foreign Application Priority Data

Feb. 15, 2006 (EP) ..................... 06003030

(51) Int. Cl.
*G06F 15/16* (2006.01)
(52) U.S. Cl. ....................... 709/203; 709/205
(58) Field of Classification Search .......... 709/203, 709/205
See application file for complete search history.

(56) References Cited

U.S. PATENT DOCUMENTS

| 5,815,668 | A * | 9/1998 | Hashimoto ............ 709/238 |
| 6,065,062 | A * | 5/2000 | Periasamy et al. ......... 709/242 |
| 6,065,325 | A | 5/2000 | Tsai |
| 6,578,160 | B1 * | 6/2003 | MacHardy et al. ......... 714/43 |
| 6,665,705 | B1 * | 12/2003 | Daniels-Barnes et al. .... 709/203 |
| 2003/0088698 | A1 * | 5/2003 | Singh et al. ............ 709/239 |
| 2003/0237018 | A1 | 12/2003 | Baba |
| 2005/0021594 | A1 * | 1/2005 | Bernardin et al. .......... 709/200 |
| 2005/0138461 | A1 * | 6/2005 | Allen et al. .......... 714/4 |
| 2005/0172161 | A1 * | 8/2005 | Cruz et al. .......... 714/4 |

FOREIGN PATENT DOCUMENTS

| EP | 0 549 325 A | 6/1993 |
| EP | 0549325 | 6/1993 |

OTHER PUBLICATIONS

"Replication and Recovery of Database State Information in Fault Tolerant Clusters"; IBM Technical Disclosure Bulletin; Oct. 1993; pp. 541-544.
Azagury, et al; "Replication and Recovery of Database State Information in Fault Tolerant Clusters"; IBM Technical Disclosure Bulletin; vol. 36, No. 10; Oct. 1993; pp. 541-544.
European search report for application No. EP 06 00 3030, search completed Jul. 27, 2006.

* cited by examiner

*Primary Examiner* — Kevin Bates
*Assistant Examiner* — Mohammed Ahmed
(74) *Attorney, Agent, or Firm* — Meyertons Hood Kivlin Kowert & Goetzel, P.C.; Jeffrey C. Hood

(57) ABSTRACT

The invention relates to a system for managing of communication between at least one client (10*a-d*) and at least one server (12*a-d*) with a primary broker (20) which comprises a first volatile memory (23) and which manages at least one request of the at least one client (10*a-d*) at the at least one server (12*a-d*). The system further comprises a backup broker (30) with a second volatile memory (33) which manages at least one request of the client (10*a-d*) at the server (12*a-d*), when the primary broker (20) has failed, wherein the primary broker (20) comprises a journal with entries on actions which may change the state of the first volatile memory (23) and sends these entries of the journal to the backup broker (30) such that the state of the second volatile memory (33) is essentially identical to the state of the first volatile memory (23).

16 Claims, 3 Drawing Sheets

FAIL-SAFE SYSTEM FOR MANAGING OF CLIENT-SERVER COMMUNICATION

PRIORITY CLAIM

This application claims benefit of priority of European application no. EP 06003030.1 titled "Fail-Safe System for Managing of Client-Server Communication", filed Feb. 15, 2006, and whose inventors are Kerstin Bein and Wolfgang Schmidt.

INCORPORATED BY REFERENCE

European application no. EP 06003030.1 titled "Fail-Safe System for Managing of Client-Server Communication", filed Feb. 15, 2006, and whose inventors are Kerstin Bein and Wolfgang Schmidt, is hereby incorporated by reference in its entirety as though fully and completely set forth herein.

TECHNICAL FIELD

The present invention relates to a fail-safe system for managing of client server communication.

PRIOR ART

Client server networks are nowadays omnipresent in the information technology. Each kind of participant at a network is considered as a client, which makes a request for a service, which is provided within the network. A server is participant within a network, which provides a service for clients in the network. For example an application program can be a client which requests data from a server in form of a data base.

The management of the communication between a plurality of clients and servers is particularly difficult if the participants of the network are heterogeneous, i.e. use different software and/or hardware. For example, there is a plurality of different operating systems and network protocols which can be used from the clients and/or the servers of a network. Variations of the clients as well as of the servers and the network architecture are also conceivable for the hardware.

Figure 1:
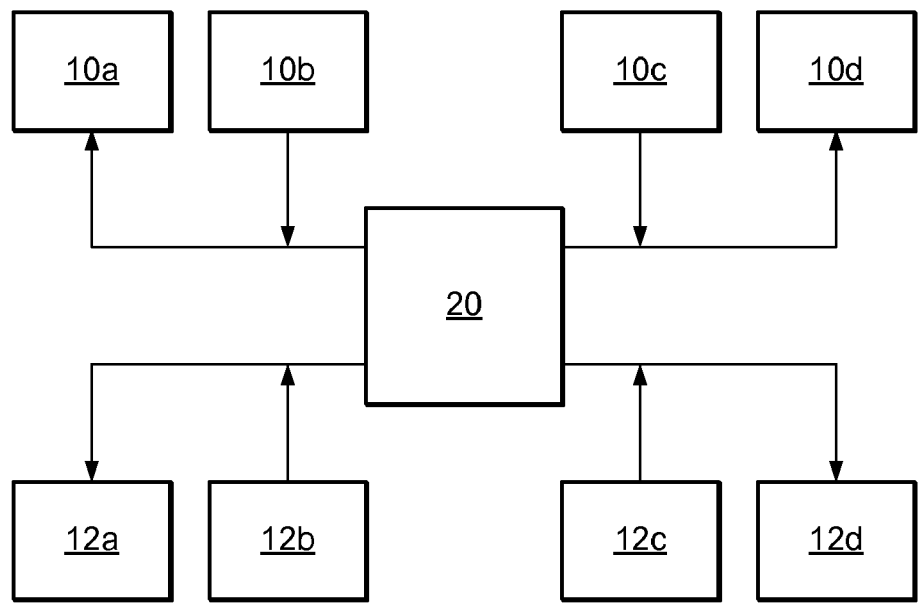

In order to overcome these difficulties it is known from the prior art, to manage the communication between the client(s) and the server(s) of a network by means of a service agent respectively broker, like it is disclosed in the EP 0 600 235 B1 of the applicant. FIG. 1 schematically shows the arrangement of broker 20 within a heterogeneous network of clients 10a-d and servers 12a-d, which is known from the EP 0 600 235 B1.

Since the broker is of crucial significance for the communication between the plurality of participants of a network its failure can lead to an undesired loss of data. It is therefore necessary to provide a mechanism by means of which a data loss can be prevented or at least minimized.

Systems known from the prior art, as for example a RAID-system allow a fail-safe storage of permanently stored data (on a hard disc or the like). Data which is within a volatile storage, i.e. the typical main memory of a computer system, however, are irrecoverable lost during a crash of the system. The above described function of the broker requires that essential parts of the communication between the clients and the servers of a network are performed within the volatile storage the so called memory pool of the broker. A backup of the permanently stored data of the broker thereby can only partially solve the problem of the security against failure.

Main frame computers of the company IBM for this purpose provide the "Parallel SYSPLEX Support". Privileged user programs can thereby use the XES (the "Cross System Extended Services") to manage "Common Storage" which can be commonly used by different MVS systems. This shared memory is provided via the "Cross-Coupling Facility (XCF)". Therefore, during a failure of one component on a LPAR ("Logical Partition") the component on another LPAR can secure the further use of the application.

Finally from the US 2005/0172161 A1 a reduction of the data loss during a failure of a "primary node" is known by providing a "secondary node". During a failure of the "primary node", which is detected by missing of a ready signal, a virtual IP address which initially points to the "primary node" is transferred to the "secondary node" and the power supply to the "primary node" is immediately cut to avoid inconsistencies during further data processing. Simultaneously, the "secondary node" gets access to a partition of the non-volatile memory, which was initially used by the "primary node". A loss of data within the volatile memory however can only partially be avoided by the system known from the US 2005/0172161 A1.

It is therefore the problem of the present invention to provide a fail-safe system for the management of client server communication, such that also the data stored in a volatile memory of a broker for communication between the clients and the servers is essentially not lost during a failure of the broker.

SUMMARY OF THE INVENTION

This problem is solved by a system for managing communication between at least one client and at least one server with a primary broker, which comprises a first volatile memory and which manages at least one request of the at least one client at the least one server. The system further comprises a backup broker with a second volatile memory, which manages at least one request of the client at the server, when the primary broker has failed, wherein the primary broker comprises a journal with entries over events, which can change the state of the first volatile memory, and which sends these entries of the journal to the backup broker, such that the state of the second volatile memory is essentially identical with the state of the first volatile memory.

When the primary broker is performing the communication between the clients and the servers and thereby processes for example all requests of participants, all relevant events are mirrored by means of the generation of the entries of the journal and by transmitting them to the backup broker. During a failure of the primary broker the backup broker is able to take over the processing of all requests without interruption, independently from the case if data associated to the events is stored permanently or only volatile, due to the consistency of both volatile memories.

Preferably the primary broker comprises a filter function, which defines which entries are written into the journal. Therefore, the journal does not protocol each modified Byte, but preferably stores all relevant changes of the objects within the volatile memory of the primary broker in a possibly compact way.

The backup broker further preferably comprises a journal interpreter, which processes the entries received from the primary broker, such that the state of the second volatile memory is essentially identical with the state of the first volatile memory. Thereby, the processing of the entries within the journal by the journal interpreter of the backup broker brings the second volatile memory into an essentially identical state as the first volatile memory, by at least one other step as the step(s) which are performed for the primary broker. As a result, the effort for processing of the entries within the backup broker is decreased, since the second volatile memory is directly brought into the state of the first volatile memory, without performing of one or a plurality of intermediate steps, which are possibly performed within the first volatile memory of the primary broker.

Preferably the primary broker indicates an identification of the backup broker within an answer to the reception of a communication from a client or a server to the client respectively to the server. It is particularly preferred, if each answer to a request of a client comprises the identification of the backup broker. A failed request to the primary broker therefore can immediately be sent again to the backup broker, for example by corresponding instructions to the interface of the corresponding application program.

Preferably the primary broker answers a communication with the at least one client and/or the at least one server which leads to an entry into the journal only after the backup broker confirms the receipt of the corresponding entry. Thereby it is secured that each relevant event within the primary broker is first secured against failure, before the processing is resumed. The backup broker therefore can resume the processing immediately if available at the point where the primary broker has failed.

To avoid inconsistencies preferably each communication with the primary broker, which leads to an entry in the journal is unambiguously identified. Preferably, thereby each request of a participant to the broker, which leads to an entry in the journal, is consecutively numbered such that for example a duplicate sending of a message is detected and stopped by the backup broker.

During use the backup broker preferably sends a test signal to the primary broker, if it did not receive a new entry over a predetermined period in time. In contrast to the above described prior art the network is not additionally loaded by permanently transmitting of a ready signal, but such a test is only used, if the backup broker does not receive an additional entry from the journal over a predetermined period in time.

Further embodiments of the system according to the invention are defined in the dependent patent claims.

Finally, the present invention relates to a computer readable medium with instructions for the provision of the above described system as well as a program with instructions for the provision of this system. The system according to the invention can thereby on the one hand be realised by a specific hardware and on the other hand by a corresponding software, which can be loaded via a data carrier or from the internet and which can be installed on an arbitrary hardware and software platform which then adopts the above defined features of the claimed system.

SHORT DESCRIPTION OF THE FIGURES

Figure 2:
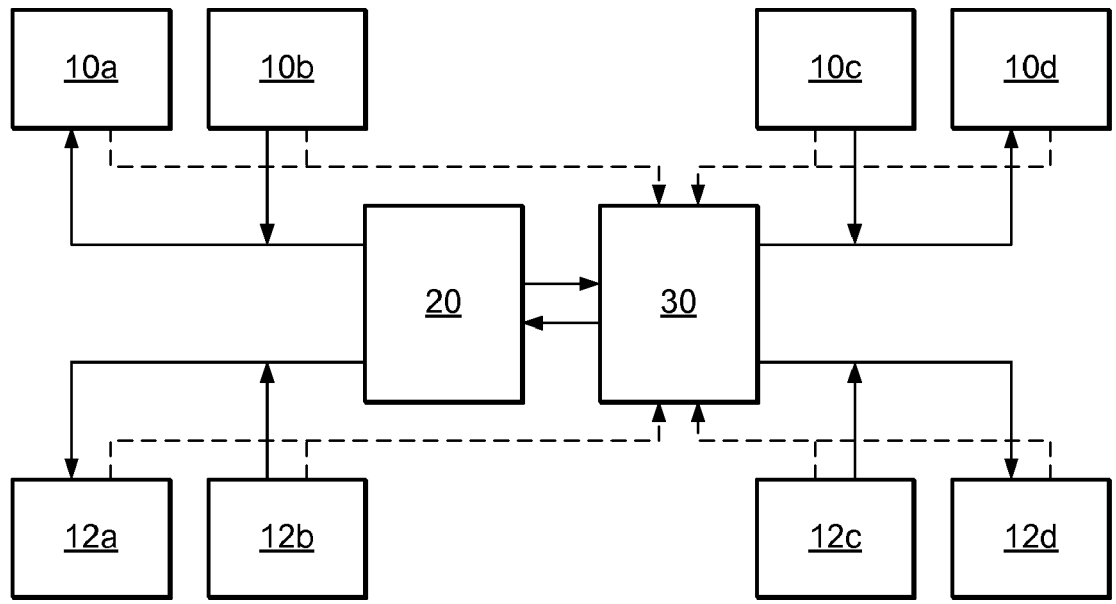
Figure 3:
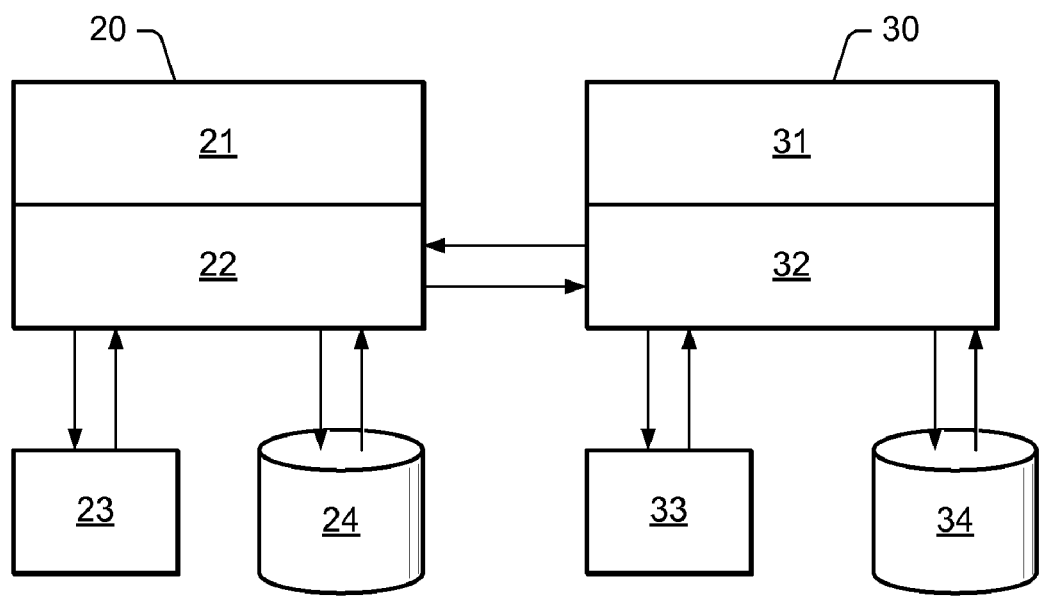
Figure 4:
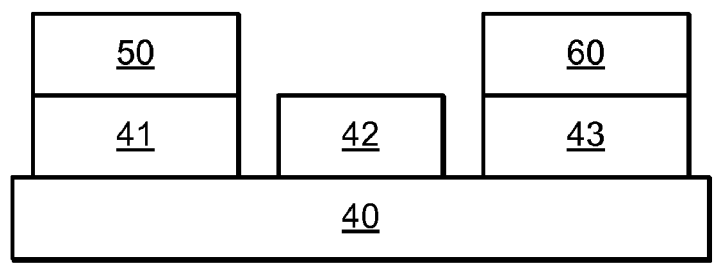
Figure 5:
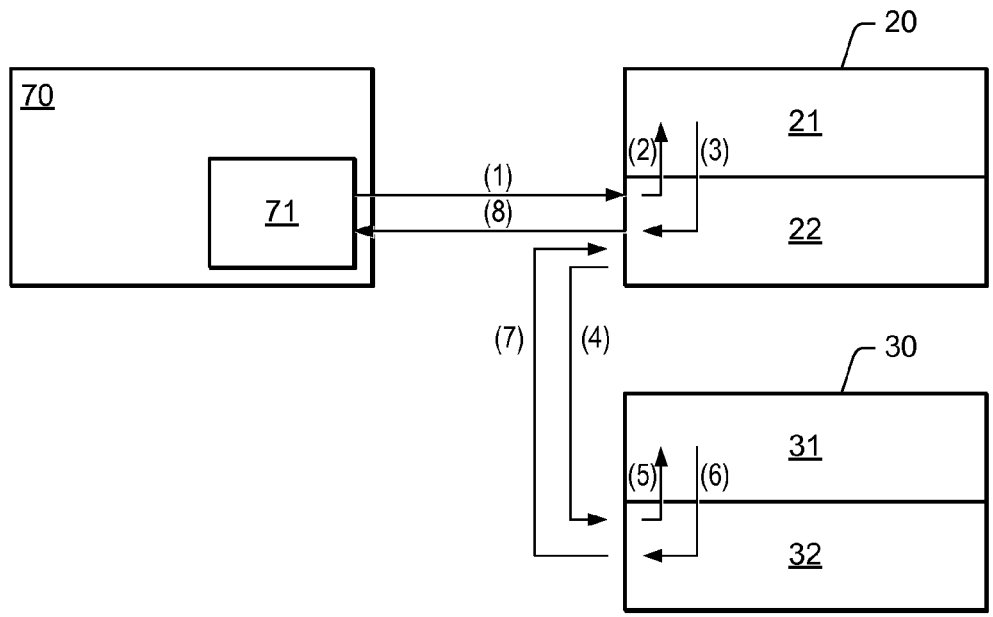
Figure 6:
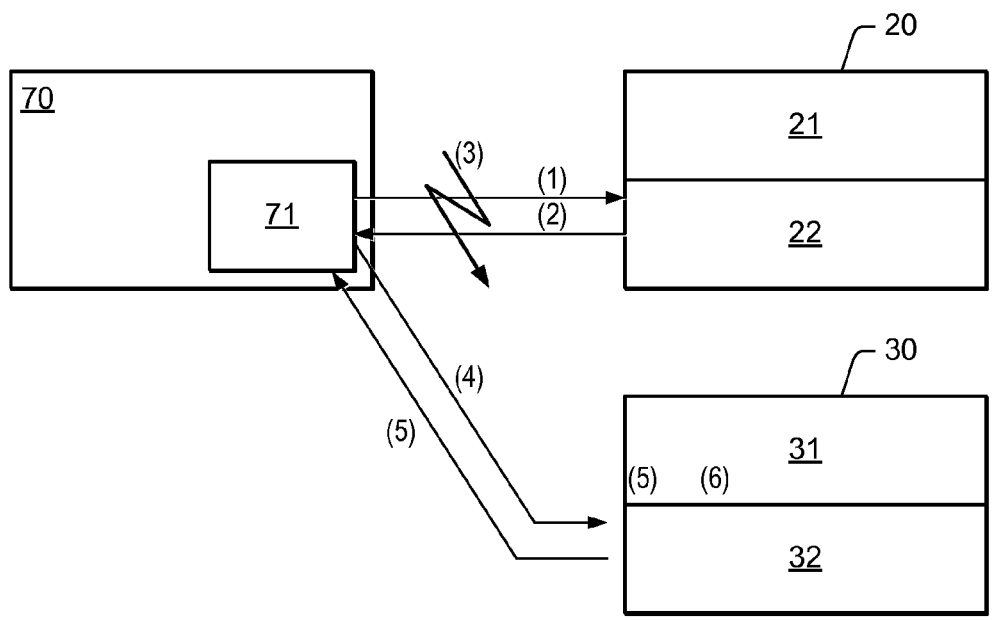

In the following detailed description actual preferred embodiments of the invention are described in more detail by reference to the accompanying figures. These figures show:

FIG. 1: the arrangement of a single broker according the prior art;

FIG. 2: a schematic representation of an embodiment according to the present invention;

FIG. 3: a schematic representation of both brokers and their volatile and non-volatile memories in the embodiment of FIG. 2;

FIG. 4: an embodiment of an arrangement of a first and a second broker on an main frame computer;

FIG. 5: a schematic representation of the steps for backing up the volatile memory of the primary broker; and FIG. 6: a schematic representation of the steps during the take-over of the managing function by the backup broker.

DETAILED DESCRIPTION OF THE PREFERRED EMBODIMENTS

A broker acts for the management of the communication among clients and servers of a network. FIG. 1, which is essentially taken from the EP 0 600 235 B1 shows schematically the arrangement of a broker 20 within a network of a plurality of clients 10a-10d and servers 12a-12d. The details of the communication between the clients, the servers and the broker, particularly the subsequently mentioned instructions and attributes, which are used during the communication, are disclosed in the EP 0 600 235 B1 as well as the plurality of management functions of broker 20.

It can immediately be seen that broker 20 in the shown arrangement is essentially for the communication between the clients 10a-10d and the servers 12a-12d. Even if the content of a non-volatile memory (not shown in FIG. 1, compare however FIG. 3, reference number 24 explained below) of the broker is secured against loss of data, for example by using of a RAID system or a similar arrangement, all data is lost during a crash and a subsequent restart of the broker 20, all data is lost which is only stored within the volatile memory the so called memory pool 23 (see FIG. 3) of broker 20. For many critical applications, for example the processes of a bank neither a temporary failure nor the loss of data is acceptable.

FIG. 2 schematically shows an embodiment of the present invention. As one can see a backup broker 30 is arranged in parallel to primary broker 20. During a failure of the primary broker 20 further communication between the clients 10a-d and the servers 12a-12d is managed via the backup broker 30 (cf. dashed lines in FIG. 2).

In addition to the arrangement described in the following with one primary broker and one backup broker it is conceivable to provide one or more further backup brokers, to provide even a higher degree of safety against failures.

Preferably for the use of the cluster shown in FIG. 2 of primary and backup broker two instances of identical release and patch versions of the broker are used, which are additionally essentially identical configured, i.e. the dimensions of control blocks, messages and other data which are defined in detail in the EP 0 600 235 B1 must also be available within the backup broker as in the primary broker. Other resources like exits, which are used in the primary broker 20, must also be existing within the backup broker 30; however they can use other names. The security for the data management is preferably done via a global security system (not shown). The non-volatile memories 24, respectively 34, which are used from the primary broker 20 and from the backup broker 30 (see FIG. 3), however, can be differently provided.

The attribute files of the primary broker 20 and of the backup broker 30 are preferably identical with those disclosed in the EP 0 600 235 B1 with the exception of the following attributes:
BROKER-ID
NUM-WORKER
PSTORE-TYPE
TRACE-LEVEL
TRANSPORT Also all other transport specific attributes may differ. For a perfect operation of primary and backup broker the dimensions of both memory pools 23 and 34 and the dimensions of both non-volatile memories (persistent stores) 24 and 34 have to be adapted to each other.

As it is shown in FIG. 2 by means of the two arrows between both brokers 20, 30 both brokers preferably communicate directly with each other wherein for an optimisation data compression can be used.

FIG. 3 shows an embodiment with two completely separated devices for the primary and for the backup broker. Therein, both brokers 20 and 30 run on a separate hardware, to achieve the highest degree of independency and thereby safety against failures of the total system. Further, each broker 20, 30 comprises its own memory pool 23, respectively 33 as well as its own non-volatile memory 24, respectively 34, for example in form of a hard disc or at least a portion thereof. Further, each broker comprises kernel components 21, respectively 31, as well as transport components 22, respectively 32.

Alternatively, also another embodiment is conceivable as it is shown schematically in FIG. 4. Herein, two instances of the broker 50, 60 run on a main frame computer, for example an IBM z900 Mainframe. Both brokers are therefore distributed onto two LPAR's (logic partitions) of the main frame computer. The reference numbers 41, 31 here indicate the respective z/OS operation systems.

A heterogeneous environment is conceivable within the embodiment of FIG. 3, if for example the primary broker 20 and the backup broker 30 are installed on computer systems with different hardware and/or different operation systems (Windows®, Unix, Linux, OS/2 etc.).

To secure within the embodiment of FIG. 3 the content of the memory pool 23 the primary broker 20 maintains a journal (not shown). The journal comprises all object related activities of all threads which are used within the broker 20 for the management of the communication with the clients 10a-d and the servers 12a-d (cf. FIG. 2). The journal comprises defined entries, which for example are necessary for the processing of a request of a participant or for processes like deleting of particular resources of broker 20.

In case of a request of a participant these data are collected within broker 20 and transferred via the direct communication link to the backup broker 30 prior to a response to the participant. Only after receiving a receipt from the backup broker 30 to the primary broker 20 the answer to the request is sent to the participant.

This process is shown in detail in FIG. 5, and comprises the following steps:

(1) The request of participant 70 (client or server) is sent via an interface 71, for example the stub explained within EP 0 600 235 B1 to the primary broker 20. The transport layer of this interface in this example waits synchronously on an answer from broker 20, i.e. the participant 70 stops its own processing until the answer is received from broker 20.

(2) Like the participant 70 the primary broker 20 comprises transport components 22 for the communication, which are simplified shown in the figures and which are commonly referenced with reference number 22. The broker 20 provides so called forwarder besides the already common transport components, which act as server in the sense of the corresponding transport protocols. They act in the sense of a corresponding transport protocol as clients and enables the primary broker 20 to send the journal and the data for the request of a participant to the backup broker 30. The backup broker 30 can send a test with a "ready signal" to the primary broker 20 via its transport components 32, to determine instantly, if the primary broker 20 fails (see below for more details).

The transport components 22 of the primary broker 20 transfers the request after the complete receipt to the kernel components 21 of the broker 20 for processing. During the processing relevant information are recorded within the journal (not shown).

(3) After complete processing, the answer to the request of participant 70 is generated.

(4) Instead of the answer, first the entry(s) to the journal and optionally further data related to the request of the participant 70 is sent to the backup broker 30.

(5) The transport components 32 of backup broker 30 transmit the journal entry(s) and the optional data to the kernel components 31 for processing by a journal interpreter, which is explained in further detail further below. By means of the processing of the entries, the memory pool 33 of backup broker 30 is brought into essentially the same state as the memory pool 23 of the primary broker 20.

(6) After complete processing, a receipt signal is generated for the primary broker 20.

(7) The receipt signal of the backup broker 30 is sent to the primary broker 20.

(8) The answer generated in step (3) is sent to the interface 71 of participant 70 and possibly transferred to an application.

All requests of the participants, internal timeouts and administrative instructions change the data within memory pool 23 and possibly also within non-volatile memory 24 of the primary broker 20. All such activities must be examined within the primary broker 20 with respect to their relevance for the backup broker 30. If actions are relevant for the backup broker 30, they are recorded by generation of a corresponding entry. The journal in charge of this is a corresponding data buffer, which is filled with the required information, preferably in binary form. Since this information describes all relevant actions for the memory pool 23, which are performed within primary broker 20, the memory pool 33 is essentially in the same state as the memory pool 23 after transfer of the entries to the backup broker 30 and the simplified processing which is explained further below.

Not all activities within the primary broker 20 lead to a journal entry. For example updated time stamps required for the generation of a statistics of all single activities are not necessarily transferred to the backup broker 30 since the replay mechanism within the backup broker performs these actions on its own during processing the journal entries. Some time stamps therefore must not be transmitted. Likewise, internal default values are preferably set by the backup broker on its own and are not transmitted as journal entries, since these values are identical in each broker of the same version.

Information requests, for example to the kernel version of the primary broker 20 or to the last "unit of work" of a participant are only for information purposes and therefore do not require mirroring within backup broker 30. A RECEIVE by which the participant indicates its possibility to receive data with respect to the primary broker 20 is preferably not mirrored until a generation of an answer thereof. Likewise the fact that a participant is in waiting state is irrelevant for the backup broker 30. Only the transmitting of a RECEIVE answer should be transmitted to the backup broker 30, since the request counter in the primary broker 20 has changed, respectively the arrangement of the messaged within a conversation can be modified, if e.g. the oldest read message was deleted.

Requests of participants to internal services of the broker 20 are not recorded, unless they modify the data structure within the memory pool 23 as e.g. a SHUTDOWN SERVER or a SUBSCRIBE TOPIC. Likewise, e.g. all non-conversational, non-permanently stored requests were filtered out, since an application in case of a failure of the broker 20 may repeat this request. The reason for such a classification is the fact that the effort for mirroring of this information is not balanced by the benefit for non-conversational applications. The total system could be loaded too heavily due to a mirroring of also this information.

All user related data is stored within the journal. LOGON, LOGOFF and all changes of fields within the participant control block (PCB, cf. below for more details) are transmitted to the backup broker 30. If the primary broker 20 fails, the lost user context is completely available within backup broker 30.

The requirements for a SEND are more complex. Journal data as well as also the sent message is preferably transmitted from the primary broker 20 to the backup broker 30. In this case, the request of a participant is transmitted as a self-contained unit subsequently to the journal data. The sequence for the function SEND_PUBLICATION is analogue.

The intelligence to notice which data must be stored within the journal and which not can be considered as a filter. This filter is active within the primary broker 20 to not consider irrelevant operations for example syntactically wrong expressed requests since this does not lead to relevant changes of objects within the primary broker 20, i.e. within memory pool 23 or even within the non-volatile memory 24.

The interpreter of the journal within backup broker 30 generates, modifies or deletes data objects according to the journal data. The interpreter is a special component of a broker, which is only active in backup mode. It works single threaded, to manipulate or additionally adapt the data within memory pool 34 of the backup broker 30 completely without problems. These actions are thereby optimized as it is further explained in the following example.

The primary broker 20 generates all objects like e.g. participant control blocks (PCBs) for a new participant, conversion control blocks for a new communication, service control blocks etc. at the moment of its initialization. The respective control block types are generated within arrays. Thereby, it is secured that e.g. all PCBs in the memory pool 23 are arranged physically one after each other. Thereby, it is possible to reach each PCB control block via an index by using the initial address of the PCB array.

| PCB 0 | PCB 1 | PCB 2 | PCB 3 | PCB 4 | PCB 5 | ... | PCB n |
|-------|-------|-------|-------|-------|-------|-----|-------|

EXAMPLE

Address PCB 2=starting address of all PCBs+fixed length of 2 PCB control blocks.

This array is mapped to a queue, the queue of the free PCBs. The anchor of this "free queue" points to PCB 0. PCB 0 points with its "next pointer" to PCB 1, which again points to PCB 2 and so on. The last PCB contains as "next pointer" a 0. This "free PCB queue" corresponds at the moment of the initialization to the physical arrangement within memory pool 23.

Further, there is an "active PCB queue" which, however, is empty at the moment of initialization of broker 20. If now for a new participant a PCB should be generated, the first entry is retrieved from the "free queue" (PCB 0), i.e. the anchor of the "free queue" points to PCB 1 wherein the remainder of this queue remains unchanged.

PCB 0 is added to the "active PCB queue". Since the queue was empty, PCB 0 is the only entry. The anchor points to PCB 0, the "next pointer" in PCB 0 is set to 0 to indicate that no further PCBs are available. During the processing, new PCBs are attached to the "active queue" and during deletion of a participant, again transmitted into the "free queue". After a certain time the logic queues have no relation anymore to the physical array. For example the "free queue" could look like this:

The anchor points to PCB 253 whose "next pointer" points to PCB 1, whose "next pointer" again points to PCB 830, and so on. This leads to the fact that broker 20, if it has for example to search for a PCB with the user ID "HUGO", it has to search the logic chain starting from the anchor of the "active queue", until the user ID is found or the end of the chain is reached. Such search runs, however, do only happen within primary broker 20 due to the simplified processing of the journal entries within backup broker 30. If, for example, the PCB with the user ID "HUGO" has the index 2000, this means for the backup broker 30 that it can use this PCB index 2000 without the need for searching, since the journal tells the backup broker to use the PCB with this index. As a result, within backup broker 30, any effort for finding information is avoided since the journal realizes direct accesses.

If the primary broker 23 fails, all relevant management objects but also the payload data in form of massages, units of work or publications (which are defined in more detail in EP 0 600 235 B1) are available within backup broker 30. Due to the synchronization via journal data, e.g. a conversation within primary broker 20 has the same CONV_ID also within the backup broker 30. As a result, all data relevant for the backup function are within the backup broker 30 as an exact copy.

The journal data for the continuous data mirroring has preferably the following structure:

| | |
|---|---|
| COMMAND: | ADD_OBJ, UPD_OBJ, DEL_OBJ |
| OBJECT: | BCT, PCB, PCBEXT, SCB, SCBEXT, CCB, TOQ, . . . |
| OBJECT-INDEX: | index of the object |
| FIELD-KEY: | object-specific identification number of object data fields; field format and field length result implicitly from the given field key. |
| FIELD-FORMAT: | i1\|i2\|i4  for integer in host order |
| | s1\|s2\|sn  for non-zero terminated character arrays in local representation |
| | x1\|x2\|xn  for hexadecimal values |
| FIELD-VALUE: | value which has to be written into the referenced field. Data representation in the format of the source host. |

The fields FIELD-KEY, FIELD-FORMAT and FIELD-VALUE can be repeated several times until FIELD-KEY EOD is set. The instruction DEL-OBJ is used without stating of FIELD-*data.

Besides this descriptive way of storing of information also meta objects are valid, if for example the context of a client should be generated, or a conversation should be associated to a particular server. Abstractions like the instruction CREATE_CLIENT shorten the amount of journal data since their required actions with respect to meta objects are known and only supplemental indices are required to synchronous perform the replay.

In addition to the mirroring of the data via journal entries also the non-volatile memories 24 and 34 can be synchronized. Such a mirroring of the data can be achieved via the dynamic addition of the backup broker 30 to the primary broker 20, however requires the effort for the transmitting of all permanently stored data from the primary broker 20 to the backup broker 30. Since this dynamic mirroring can be run isolated the copying respectively converting of the non-volatile memory can be done also during maintenance times.

Preferably each request of a participant at the primary broker 20 contains the ID of the backup broker 30 within the answer. During a failure of the primary broker 20 therefore the request from the interface 71 can immediately be sent to the backup broker 30. As long as the backup broker 30 is activated as primary broker during the process which is explained below in further detail, it accepts requests from participants and continuous existing conversation or publications. The ID for the broker within the API is correspondingly modified.

In order to avoid duplication of a request of a participant— the failure of the primary broker 20 can happen prior, during or after the processing of the request—each request per participant is consecutively numbered, such that a double sending of information can be detected and stopped within backup broker 30.

The take-over of the function as a broker by the backup broker 30 runs as follows: In parallel to the above described efficient processing of the journal entries transmitted from the primary broker 20 a sensor respectively a control program (not shown) runs within backup broker 30, such that after exceeding a definable waiting time (attribute PRIMARY-BROKER-NONACT) pings are sent to the primary broker 20 to check its availability. If the answer is not provided within the PRIMARY-BROKER-NONACT the backup broker is activated, i.e. the rejecting of the direct receipt of normal requests from participants is shut-off. Further, the journal interpreter is stopped and the normal operation as a broker begins. All participants request with a consecutive number, which is smaller or the same as the already processed number are rejected by means of a special error message, to avoid a generation of double messages or other duplication is avoided.

The interface considers the rejection of a doubled SEND without the need to inform the application. A RECEIVE is never rejected. If the message has already been transmitted, the backup broker interprets a repeated request as RECEIVE LAST.

FIG. 6 shows the steps for the taking over of the function as a broker in detail:

(1) The interface 71 of application 70 uses the ID of the primary broker 20 for addressing a request.

(2) After processing of the request the answer is sent from the transport component 22 of the primary broker 20 to the interface 71. The answer also contains the address of the available backup broker 30.

(3) The connection to the primary broker 20 is broken. The backup broker 30 does not receive any journal entries anymore. After reaching the value PRIMARY-BROKER-NONACT a ping is sent from the backup broker 30 to the primary broker 20. If the ping remains non-answered for the PRIMARY-BROKER-NONACT time, the backup broker 30 initiates the emergency program. To this end the backup broker 30 performs a take-over sequence, which activates it as primary broker. This comprises the accepting of all connection requests and the processing of requests of the participants. If no further backup broker exists at this moment no establishing of a contact for securing the data within the volatile memory 33 is done.

(4) Since the primary broker 20 cannot be reached anymore, the interface 71 changes the ID for the broker and tries to contact the backup broker 30. After successful take-over the backup broker 30 functions and accepts the participant request.

(5) After processing of the participant request an answer is sent from the transport component 32 of the backup broker 30 to the interface 71. This answer does not contain an address of a new backup broker, unless in the meantime a further backup broker is started, which is explained further below.

In the following an addition of a backup broker to a running primary broker is explained. This process is for example done, if after the failure of a primary broker in the above described way the backup broker takes over the role of the primary broker and now for keeping the securing against failure a further backup broker is added for example the re-started initial primary broker or a third broker which should act as a new backup broker.

The process of adding blocks the primary broker 20 for a short period of time which acts up to this moment alone. In this time a data exchange between the primary broker 20 and the backup broker 30 is done. Initially, the non-volatile memory is transmitted.

The possibility to transmit the non-volatile stored data from memory 24 of the primary broker 20 to the non-volatile memory 34 of the backup broker 30 to be added, allows independently of other processes to easily transfer user data, wherein it is non-relevant, whether the type of the non-volatile memory of the source and the target are identical or not. Even the operating systems can be different. The protocol for transmitting the information to be permanently stored and the kind of the transmission make the transfer totally flexible.

Subsequently the transmission of all relevant data from the memory pool 23 is done. Similarly to the consecutive journal to this end the data in the memory pool 23 is sent to the backup broker 30 via a complete journal. A complete journal is necessary since the complete memory pool 23 has to be analysed and to be mirrored if necessary. Since these processes require system which is consistent in itself no participant request must be processed during the synchronisation of primary broker 20 with the backup broker 30.

The transfer protocol of the permanently stored data transmits the units of the work by means of the journal protocol:

| | |
|---|---|
| COMMAND: | ADD_OBJ |
| OBJECT: | UOW |
| OBJECT-INDEX: | index of the object |
| FIELD-KEY: | object specific identification numbers for object data fields; field format and field length result implicitly from the given field key. |
| FIELD-FORMAT: | i1\|i2\|i4     for integer in host order |
| | s1\|s2\|sn     for non-zero terminated character arrays in local representation |
| | x1\|x2\|xn     for hexadecimal values |
| FIELD-VALUE: | value, which has to be written into the referenced field. Data representation in the format of the source host. |

The information stored within the UOW is transmitted as a binary array. The reconstruction of control information from the binary array is done on the target host, in order to convert for example encoding descriptor or message lengths into the local representation.

Subsequently the process for start and stop of the cluster operation of the primary broker 20 and of the backup broker 30 is explained. If both instances of the broker should almost simultaneously be activated the following steps are necessary:

The primary broker 20 is started with "RUNMODE=PRIMARY". Additional via "PARTNER=broker_id" the transport address of the backup broker 30 is defined within the attribute file. After the start-up of the primary broker 20 it is tried to contact the partner. As long as the backup broker 30 does not answer, the primary broker 20 is not available for participant requests. The backup broker 30 is started with "RUN-MODE=BACKUP". Additionally via "PARTNER=broker_id" the transport address of the primary broker 20 is defined within the attribute file. After the start-up of the backup broker 30, it is tried to contact the partner. As long as the primary broker 20 does not answer, the backup broker 30 remains in waiting position. These delays however do not lead to a transfer of the role of the primary broker 30.

After the hand-shake of both brokers 20, 30 it is determined whether the backup broker 30 has to be initially synchronized or if both are ready for the cluster operation with journal based updating. If a synchronisation is necessary the above explained steps have to be performed which are necessary during a dynamic adding of a backup broker 30.

For stopping of both brokers preferably the following sequences are performed:

Common stopping of primary 20 and backup broker 30 (instruction SHUTDOWN_CLUSTER):

(1) The PARTNER broker is informed of the upcoming SHUTDOWN.

(2) The primary broker 20 does not accept new requests anymore.

(3) The backup broker 30 performs all pending journal sentences and acknowledges.

(4) The primary broker 20 sends all answers for all un-answered requests, respectively stops blocking calls.

(5) The primary broker 20 and the backup broker 30 synchronize the common SHUTDOWN.

(6) The primary broker 20 and the backup broker 30 stop.

Stopping of the primary broker 20 (instruction SHUTDOWN_BROKER):

(1) The backup broker 30 is informed of the upcoming SHUTDOWN.

(2) The primary broker 20 accepts no new participant requests anymore.

(3) The backup broker 30 processes all pending journal sentences and acknowledges.

(4) The primary broker 20 sends answers for all non-answered participant requests, respectively stops blocking calls.

(5) The primary broker 20 and the backup broker 30 synchronise the SHUTDOWN of the primary broker 20.

(6) The primary broker 20 stops.

(7) The backup broker 30 performs the TAKEOVER sequence which activates it as primary broker. This comprises the accepting of all connecting requests and the processing of participant requests.

(8) Since at this moment no backup broker exists any no contact is established.

Stopping of the backup broker (instruction SHUTDOWN_BROKER with option STOP_CLUSTER_MODE).

(1) The primary broker 20 is informed of the upcoming SHUTDOWN.

(2) The primary broker 20 stops the transmission of journal sentences to the backup broker 30; therefore operates in normal operation.

(3) The backup broker 30 starts the SHUTDOWN and ceases the processing.

The invention claimed is:

1. System for managing of communication between at least one client and at least one server comprising:
   a. a primary broker with a first volatile memory, which wherein the primary broker manages requests of the at least one client directed to the at least one server;
   b. a backup broker with a second volatile memory which manages the requests of the client directed to the at least one server if the primary broker has failed;
   c. wherein the primary broker comprises a journal with entries on actions which may change the state of the first volatile memory and which sends these entries of the journal to the backup broker such that the state of the second volatile memory is essentially identical to the state of the first volatile memory;
   d. wherein the primary broker informs one of the at least one client or the at least one server of an identification of the backup broker in response to the receipt of a communication from the at least one client or the at least one server, respectively; and
   e. wherein each answer to the requests of the at least one client comprises the identification of the backup broker.

2. System according to claim 1, wherein the primary broker comprises a filter function which defines which entries are written into the journal.

3. System according to claim 1, wherein the backup broker comprises a journal interpreter which receives and processes the entries received from the primary broker, such that the state of the second volatile memory is essentially identical to the state of the first volatile memory.

4. System according to claim 3, wherein the processing of the entries within the journal by the journal interpreter of the backup broker brings the second volatile memory into the state essentially identical to the state of the first volatile memory by means of at least one step which is different from the step(s) which are performed within the primary broker.

5. System according to claim 1, wherein the primary broker only answers a communication with the at least one client or the at least one server which leads to an entry within the journal after the backup broker acknowledges the receipt of the corresponding entry.

6. System according to claim 1, wherein each communication with the primary broker which leads to an entry within the journal is unambiguously identified.

7. System according to claim 6, wherein each request of a participant to the primary broker, which leads to an entry within the journal is consecutively numbered.

8. System according to claim 1, wherein the backup broker sends a test signal to the primary broker, if it does not receive a new entry within a particular time.

9. System according to claim 8, wherein the backup broker for the communication with the at least one client and the at least one server is ready to receive, when the primary broker does not respond to the test signal within a predetermined time.

10. System according to claim 1, wherein the backup broker can be added to the primary broker at an arbitrary moment, by transmitting all entries stored in the journal at this moment to the backup broker and by processing them therein.

11. System according to claim 10, wherein additionally data of a non-volatile memory of the primary broker is transmitted to a non-volatile memory of the backup broker.

12. A non-transitory computer-readable memory medium comprising program instructions, wherein the program instructions are executable to implement:
   a. a primary broker with a first volatile memory, which wherein the primary broker manages requests of the at least one client directed to the at least one server;
   b. a backup broker with a second volatile memory which manages the requests of the client directed to the at least one server if the primary broker has failed;
   c. wherein the primary broker comprises a journal with entries on actions which may change the state of the first volatile memory and which sends these entries of the journal to the backup broker such that the state of the second volatile memory is essentially identical to the state of the first volatile memory;

d. wherein the primary broker informs one of the at least one client or the at least one server of an identification of the backup broker in response to the receipt of a communication from the at least one client or the at least one server, respectively; and e. wherein each answer to the requests of the at least one client comprises the identification of the backup broker.

13. A non-transitory computer-readable memory medium according to claim 12, wherein the primary broker comprises a filter function which defines which entries are written into the journal.

14. A non-transitory computer-readable memory medium according to claim 12, wherein the backup broker comprises a journal interpreter which receives and processes the entries received from the primary broker, such that the state of the second volatile memory is essentially identical to the state of the first volatile memory.

15. A non-transitory computer-readable memory medium according to claim 14, wherein the processing of the entries within the journal by the journal interpreter of the backup broker brings the second volatile memory into the state essentially identical to the state of the first volatile memory by means of at least one step which is different from the step(s) which are performed within the primary broker.

16. A non-transitory computer-readable memory medium according to claim 12, wherein the primary broker only answers a communication with the at least one client or the at least one server which leads to an entry within the journal after the backup broker acknowledges the receipt of the corresponding entry.

\* \* \* \* \*